Figure 1:
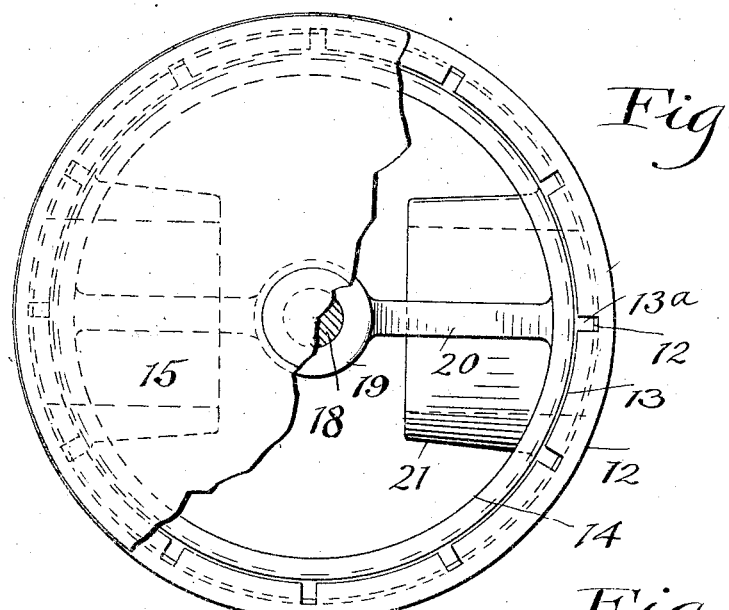

O. M. NACKER.
PISTON FOR INTERNAL COMBUSTION ENGINES.
APPLICATION FILED JAN. 19, 1917.

1,283,865.

Patented Nov. 5, 1918.

Inventor
Owen M. Nacker
By Thurston & Kwis
attys

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

PISTON FOR INTERNAL-COMBUSTION ENGINES.

1,283,865.  Specification of Letters Patent.  Patented Nov. 5, 1918.

Application filed January 19, 1917. Serial No. 143,202.

*To all whom it may concern:*

Be it known that I, OWEN M. NACKER, a citizen of the United States, residing at Detroit, in the county of Wayne and State of Michigan, have invented a certain new and useful Improvement in Pistons for Internal-Combustion Engines, of which the following is a full, clear, and exact description.

The invention is a piston especially adapted for internal combustion engines. The object is to prevent leakage around the piston, without using the commonly employed, expansible piston rings which, in the accomplishment of their purpose, press outward against a cylinder wall and cause undesirable friction and consequent wear.

The invention consists in the construction and combination of parts shown in the drawing and hereinafter described and definitely pointed out in the appended claims.

Figure 2:
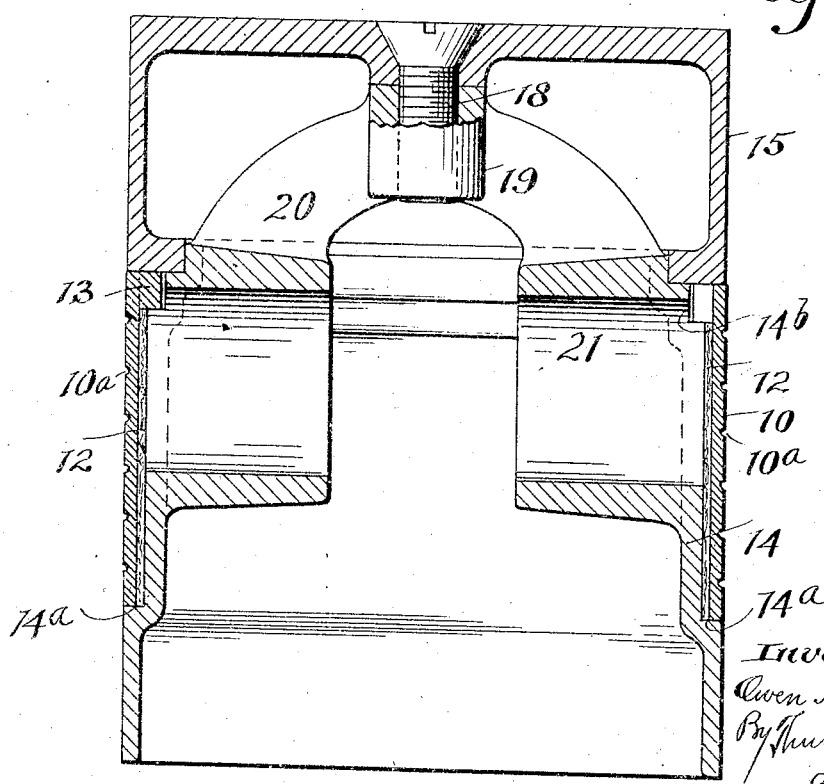

In the drawings Figure 1 is a top plan view of the piston with the head thereof removed, and Fig. 2 is a central vertical sectional view of a piston in which the invention is embodied.

In carrying out the invention the piston is constructed with an annular recess into which there is fitted a solid, *i. e.*, unsplit sleeve 10, which is so thin that it will conform to the cylinder walls even if the cylinder be slightly out of round. Additionally, this sleeve is insulated from the body of the piston by a thin layer of asbestos 12, or other similar heat insulating material, which is sufficiently yielding to permit the thin sleeve to flex to the extent necessary to conform to the cylinder walls as stated.

Obviously, pistons having the above specified characteristics of the present invention may be practically constructed in numerous ways. In the specific example shown in the drawing the piston is formed of two parts, namely, the body 14 and the head 15. In the body and from its top downward for a distance of three or four inches, an annular recess is machined into the surface, and the sleeve 10 is slipped down in this annular recess with the asbestos packing 12 behind it until the lower end of the sleeve rests upon the shoulder 14ª at the lower end of the annular recess. The sleeve is held down in the described position by the piston head 15 which is in turn held down by a centrally placed screw 18 which screws into a tapped boss 19. This boss is connected by arms 20 with the piston pin bosses 21 which are integral with the body part of the piston. An inwardly directed annular rib 13 may be formed on the upper end of the sleeve 10, and this enters and fits easily in an annular groove 14ᵇ in the upper end of the piston body. The sleeve 10 should be made of material which has substantially the same coefficient of expansion as the cylinder in which it is to be employed. In order that the rib 13, which is thicker than the sleeve 10, may not, by its expansion and contraction, materially affect the external diameter of the sleeve this rib is slotted in several different places.

External grooves 10ª are formed in the outside of the piston sleeve. These are intended to function as oil carriers and oil packing grooves, wherefore there will usually be a film of oil between the surface of this sleeve and the opposed surface of the cylinder wall. The sleeve should fit the piston tightly enough to prevent leakage. If it does this under one of the conditions in use it will do it under all of the conditions in use, because it will not be much expanded by heat transmitted to it from the piston itself, and such expansion as does take place will take place and will be substantially the same as the expansion which takes place at the same time in the walls of the cylinder.

Having thus described my invention, what I claim is:

1. A piston comprising a body and a head which are separably connected together, said body having an external annular recess extending from its top downward, and the upper end of said recess being deeper than the remainder, combined with an unsplit thin walled flexible metallic sleeve made of a metal having the same coefficient of expansion as the cylinder with which this piston is to be used, which sleeve is loosely fitted into said recess and has an inwardly extended notched flange which projects into the deepened part of said recess.

2. A piston comprising a body and a head which are separably connected together, said body having an external annular recess extending from its top downward, and the upper end of said recess being deeper than the remainder, combined with an unsplit thin walled flexible metallic sleeve made of a metal having the same coefficient of expansion as the cylinder with which this piston is to be used, which sleeve is loosely fitted into said recess and has an inwardly extended notched flange which projects into the deepened part of said recess, and a thin sleeve of low heat-conducting material interposed between said metallic sleeve and the part of the piston embraced thereby.

3. A piston comprising a hollow body formed with internal piston bosses and with a longitudinal tapped boss which is connected by arms with said piston bosses,—which body has an external annular recess extending from its top downward, combined with an unsplit thin walled flexible metallic sleeve fitted to said recess, and a head which engages with the top of said sleeve and with the top of said body, and a screw which screws down through the piston into said threaded boss.

In testimony whereof, I hereunto affix my signature in the presence of two witnesses.

OWEN M. NACKER.

Witnesses:
THEODORE W. MARSH,
PERCY F. TODD.